Figure 1:
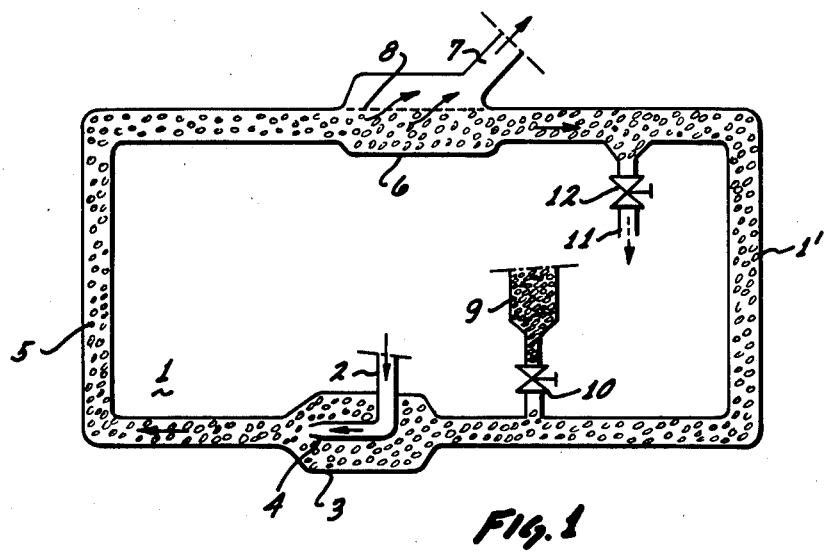

United States Patent [19]

Pielkenrood

[11] 4,062,775

[45] Dec. 13, 1977

[54] METHOD AND A DEVICE FOR PROMOTING THE SEPARATION OF COMPONENTS SUSPENDED IN A LIQUID

[75] Inventor: Jacob Pielkenrood, Krommenie, Netherlands

[73] Assignee: Pielkenrood-Vinitex B. V., Assendelft, Netherlands

[21] Appl. No.: 582,676

[22] Filed: June 2, 1975

[51] Int. Cl.² .................. B01D 23/10; B01D 33/30; B01D 35/00; B01D 37/00
[52] U.S. Cl. ........................................ 210/189; 210/20
[58] Field of Search ................ 210/23 R, 33, 20, 189, 210/DIG. 5

[56] References Cited

U.S. PATENT DOCUMENTS

| 1,608,661 | 11/1926 | Nordell | 210/189 X |
|---|---|---|---|
| 1,620,431 | 3/1927 | Bramwell | 210/189 |
| 2,731,149 | 1/1956 | Findlay | 210/189 |
| 3,565,798 | 2/1971 | Barnes | 210/33 X |
| 3,902,996 | 9/1975 | Murkes | 210/20 |
| 3,948,768 | 4/1976 | Chapman | 210/20 |

Primary Examiner—Frank A. Spear, Jr.
Assistant Examiner—D. R. Sadowski
Attorney, Agent, or Firm—George F. Smyth

[57] ABSTRACT

For obtaining coalescence of particles suspended in a carrier liquid, a plurality of relatively small bodies are circulated in a closed cycle together with a part of the suspension, and in the narrower interspaces between said bodies and on the surfaces thereof the probability of particles meeting one another is increased. Carrier liquid with suspended coalesced particles is continuously withdrawn from the closed cycle, and fresh liquid is continuously introduced therein, the circulating movement of the bodies being maintained either by the kinetic energy of the introduced liquid or by injecting an auxiliary driving medium into the liquid flow.

4 Claims, 8 Drawing Figures

U.S. Patent   Dec. 13, 1977   Sheet 1 of 2   4,062,775

METHOD AND A DEVICE FOR PROMOTING THE SEPARATION OF COMPONENTS SUSPENDED IN A LIQUID

Particles which are suspended in a liquid can be coalesced by promoting mutual contact between these particles, for instance by forcing the liquid to flow through narrow passages, for instnace in a layer of sponge-like material or between tightly packed spherical bodies, and preferably there should be a certain adhesion between the suspended particles and the sponge material or spherical bodies.

The effect will be better as the residence time in these passages is longer. This can be obtained, on the one hand, by reducing the flow velocity, but this will lead either to a low yield or to considerable dimensions of the coalescence device. On the other hand the thickness of the layer can be increased, but this will lead to an accordingly increased flow resistance.

The invention provides a method and a device in which substantially spherical bodies are used, but in which the aforementioned draw-backs can be avoided. This is obtained by causing these bodies to flow in a closed cycle to which the liquid to be treated is added, and from which the excess liquid with coalesced or already separated components is removed in such a manner that the bodies remain in the cycle, the liquid being introduced into this cycle in such a manner that a closed liquid flow is obtained in which the bodies are entrained.

The energy of the liquid injected into the cycle can be sufficient to obtain the required cyclic movement of the bodies, which will be the case, for instance, if the liquid is supplied from a sufficient height. It is also possible to use a pump for obtaining a sufficient velocity, but then there is a risk that the suspended components will lead to soiling or wear of the pump.

In a preferred embodiment the cyclic movement is maintained by adding energy to the mixed flow, either by using mechanical means or by injecting an additional liquid or gas at a suitable velocity to the flow.

Figure 2:
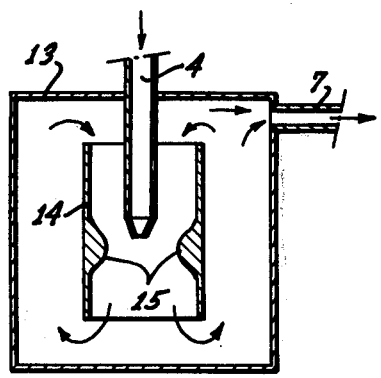
Figure 3:
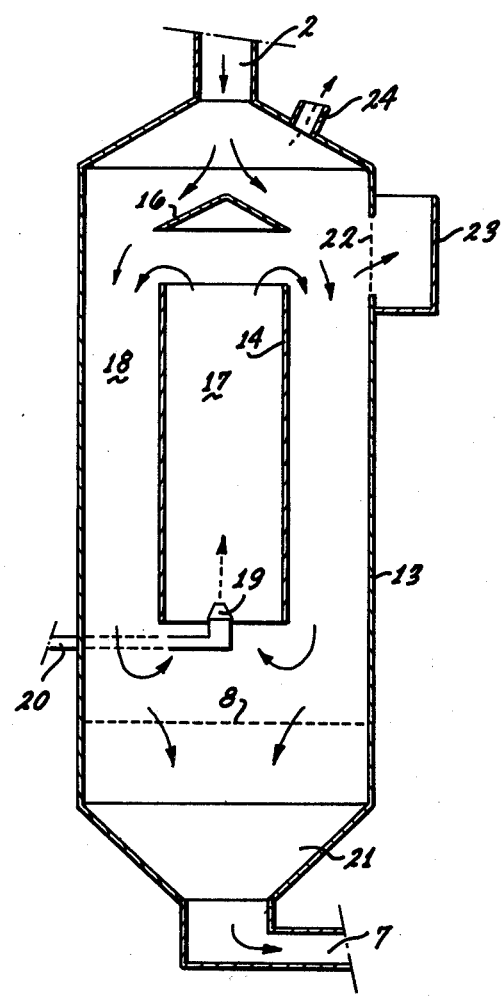
Figure 4:
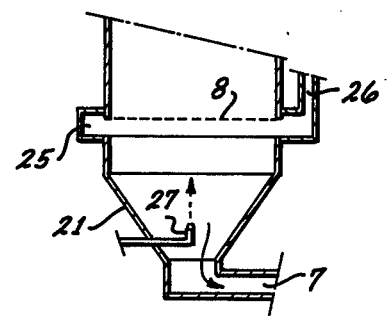

The invention will be elucidated below by reference to a drawing, showing in:

FIG. 1 a schematic representation of a basic embodiment of the invention;

FIG. 2 a simplified representation of a modification of the device of FIG. 1;

FIG. 3 a simplified representation of another basic embodiment of the invention; and FIG. 4 a modification of the lower part of the device of FIG. 3.

Figure 5:
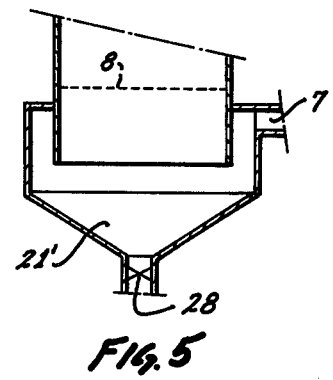

FIG. 5 . . . 8 modifications of the device of FIG. 3.

In FIG. 1 a device according to the invention is shown in principle, which device comprises a substantially closed circuit formed by a tubular duct 1. In the example shown this duct comprises vertical parts, but it is also possible to use only horizontal parts without changing anything in the operation of the device.

The liquid to be treated is supplied by a duct 2 which is introduced into the duct 1 in a supply chamber 3, and terminates in a substantially coaxial nozzle 4 forming, together with the walls of the supply chamber 3, an injection pump so that, when the liquid is supplied at a sufficient pressure, the liquid already present will be propelled as indicated by arrows.

In the liquid a plurality of relatively small and substantially regularly shaped bodies 5, e.g. small spheres, are present, which bodies consist of a suitable material which is not attacked by the liquid to be treated.

The liquid flows together with these spheres from the supply chamber 3 through the duct 1 towards a discharge chamber 6 to which a discharge duct 7 for the liquid is connected. In the chamber 6 a grid 8 is provided which prevents that the spheres 5 are entrained by the liquid flow towards the duct 7. An equilibrium will be obtained so that a part of the liquid will flow through the return branch 1' interconnecting the chambers 6 and 3, and the rest is discharged through the duct 7 towards a separation device for separating the suspended component from the liquid.

In the liquid flow with the spheres 5 entrained thereby the components suspended in the liquid can coalesce, since in the interspaces between these spheres velocity differences will occur so that suspended particles can overtake one another and, thus, can contact each other which may lead to coalescence. Moreover the spheres 5 may be wettable by the suspended components so that at the surface of these spheres the coalescence probability will be higher. In this manner the suspended particles can grow to such dimensions that the separation in a separator connected to the duct 7 is improved.

The number of spheres 5 can be increased by supply from a reservoir 9 through a valve 10, and spheres can be removed from the cycle through a duct 11 provided with another valve 12. In this manner the number of spheres and, thus, the packing density thereof, can be adapted to the circumstances, and spheres which have become too heavy by accumulated lime or the like can be removed and replaced by new spheres.

It is also possible to use porous spheres or spheres with a rough surface so that the impurities or a part of the components will be deposited on the pores or on the surface irregularities. The spheres are, then, to be removed after some time, and can be cleaned or will be destroyed, depending on the fact whether recuperation of the attached substances is of sufficient importance.

The average residence time of the liquid in the cycle depends on the proportion between the liquid supply and the amount of liquid flowing back through the return branch 1', which, of course, depends on the ratio of the flow resistances of both branches of duct 1.

FIG. 2 shows a simplified representation of a device of this kind in which the cycle is completely included within an outer vessel 13 in which a coaxial inner vessel 14 is disposed, and the supply nozzle 4 is coaxially disposed inside the inner vessel 14. The liquid flow is indicated by arrows, and it will be apparent that the operation does not differ from that of the basic construction of FIG. 1. The pump action can be improved by providing a constriction 15 near the free extremity of the nozzle 4. In FIG. 2 and the following Figures the bodies 5 have not been indicated for the sake of simplicity.

FIG. 3 shows a preferred embodiment of the device according to the invention, which is a further development of the device of FIG. 2, and parts corresponding to similar parts shown in FIGS. 1 and 2 are indicated by the same reference numerals.

The device shown in FIG. 3 is, in particular, intended for separating oil from water or for similar purposes. This device comprises an outer vessel 13 with a vertical axis, within which a coaxial inner vessel 14 is provided. At the upper side of the vessel 13 a supply 2 for the liquid to be treated is provided, below which a cap 16 is situated covering the upper side of the passage 17 within the inner vessel 14, so that the liquid supplied at 2 will completely arrive in the passage 18 between the inner vessel 14 and the outer vessel 13. At the lower end of the passage 17 a nozzle 19 or a corresponding assembly of nozzles is provided which is connected to a conduit 20 for supplying compressed air.

At the lower end the inner space of the vessel 13 is closed by a grid or sieve 8 having meshes which are small enough to retain the spherical bodies present in the passage 17 and 18.

Below the grid 8 a discharge funnel 21 is situated which is connected to an outlet duct 7 for the treated liquid. Near the upper side of the passage 18 a grid 22 is provided in the wall through which oil floating on the liquid can flow off towards a discharge 23 which may be provided with means, such a suitable overflow weirs, for separating the oil from entrained water, the water being returned in some suitable manner towards the vessel 13.

The operation of this device is as follows. The air introduced through the nozzle 19 is divided through the liquid in the form of larger or smaller air bubbles. The average specific weight of the liquid in the passage 17 will, therefore, become smaller so that the liquid in the passage 18, in the manner of a liquid manometer, will press the lighter liquid upwards. The latter then flows over the upper rim of the inner vessel 14, and at the enlarged liquid surface of the vessel 13 the air can easily escape. When the vessel 13 is closed at its upper end, an air escape opening 24 will be provided therein. This operation resembles that of a so-called bubble or mammoth pump. The deaerated liquid flows downwards again through the passage 18 and will be lead upwards again by injection of air. The liquid to be treated is supplied at 2, and is uniformly divided over the passage 18 by the cap 16. In this passage the liquid is intimately contacted by the entrained spherical bodies, so that the coalescence effect described above will take place. This is, generally, sufficient for completely separating the oil in the rising flow in the passage 17. Moreover an extraction effect is caused by the rising oil drops in the passages 17 and 18. In correspondence with the liquid supply the excess water is discharged through the duct 7. The latter duct may, for instance, be turned upwards so as to obtain a static pressure equilibrium so that only the excess is discharged. The oil floating upwards can flow off through the grid 22, and is, subsequently, separated from the entrained water by means of an afterseparator.

FIG. 4 shows a modification of the lower part of the device of FIG. 3, which is adapted to the case that the liquid to be treated is heavily polluted, e.g. by a shockwise oil charge or by a very high silt content. In the case of a very high oil charge, in which oil may be collected below the grid 8, a space 25 is provided in which the oil will be collected, which will be removed through a duct 26. In the case of a high silt content, which may lead to clogging of the grid 8, an auxiliary nozzle 27 is provided by means of which compressed air can be injected for quickly removing the clogging of the grid 8.

The above-mentioned operation, is, of course, only an example of application of the method according to the invention, to which the invention is not restricted. Such a device can be modified in many ways. For instance the supply may be positioned at the lower, and the outlet at the upper side, and it is also possible to arrange the supply and the outlet at the same side, provided that provisions are made for preventing mixing of the supplied and discharged flows. Furthermore such a device is also suitable for treating other suspensions than oil-water suspension.

FIG. 5 shows an example of a similar device adapted for suspensions with a component which is heavier than the carrier liquid. Below the grid 8 a collecting vessel 21' for sediment is arranged, and the liquid can be discharged above the level of the sediment through a duct 7. The vessel 21' is, at its lower end, provided with a valve 28 or the like for controlling the removal of the sediment. Of course the outlet 7 can also be provided at the upper side of the device.

If, now, no or no complete separation but only mainly coalescence takes place, the discharged liquid is to be stripped of the coalesced particles in an additional separator. If gas bubbles are suspended in the liquid, the gas will escape at the upper side from the liquid, and will flow off together with the air.

Instead of air also another gas or a liquid can be injected, having a specific mass which is different from that of the liquid to be treated. If such a liquid is heavier than the carrier liquid, it should, of course, be introduced at the upper side. Such an auxiliary medium should be only slightly miscible with the carrier liquid, so that on leaving the passage in which the supply has taken place an easy separation can be obtained.

Instead of the described pump action with the aid of an additional medium with a different specific mass, it is also possible to inject a driving substance so fast that its kinetic energy is sufficient for entraining the carrier liquid to the described extent. In particular the purified carrier liquid can be used therefor.

Supplying additional driving energy can also take place by providing in at least one of the passages 17 or 18 a mechanical driving means such as a screw or paddle pump wheel, as will be described below. The injection of an additional driving medium can also take place in the passge 18 instead of in the passage 17, the circulation then taking place in the opposite sense.

Figure 6:
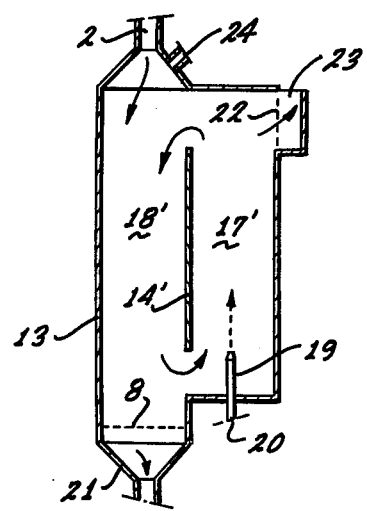

Moreover, instead of the coaxial construction of FIG. 3, a single partition 14' can be used, as shown in FIG. 6, dividing the vessel 13 into two parts, and at one side of the partition 14' a space 17' withan upward flow, and at the other side a space 18' with a downward flow are situated.

The residence time of the liquid to be treated in the device is an important factor for the effect to be reached. This depends, of course, on the character of the suspension. The residence time can be prolonged by increasing the height of the device. If this is not possible or not desired, a plurality of such devices can be connected in series.

Figure 7:
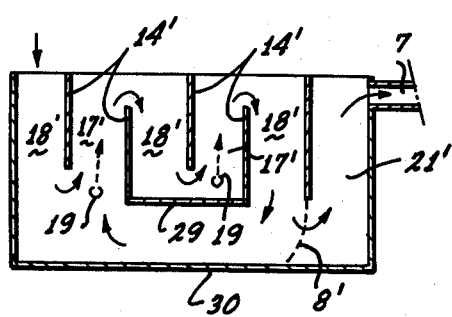

FIG. 7 shows a special embodiment of a series connection, in which the vessel 13 is divided by means of a number of partitions 14' into a corresponding number of passages 17' and 18', and in suitable points nozzles 19 for introducing the driving medium are provided. An additional bottom 29 delimits a return channel 30 for the bodies entrained by the liquid, which channel is separated by a grid 8' from an outlet chamber 21' for the carrier liquid, an outlet duct 7 being connected to the latter chamber.

In the drawing single nozzles 19 are shown, but, in practice, a plurality of nozzles which are uniformly distributed over the passage 17 will be used in order to obtain a uniform mixing of the driving medium with the liquid. In the case of a very dense packing of the circulated bodies it may happen that the introduced air will form larger air cushions, but the operation will be the same then.

Although it is, generally, preferred to lead the treated liquid discharged through the outlet 7 towards a separating device, in particular a plate separator, it is also possible to include such a separator in the closed circuit in which the bodies are situated.

Figure 8:
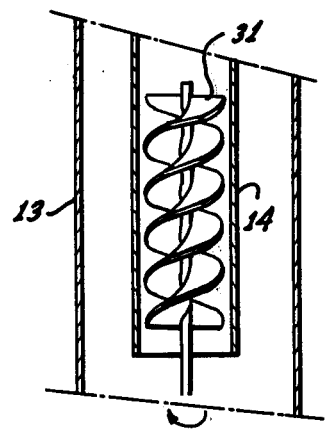

FIG. 8 shows a modification of the device of FIG. 3, in which the nozzle 19 is replaced by a rotatable screw pump element 31 for driving the liquid and the bodies 5 in the desired sense. An advantage of such a mechanical driving means is that it increases the packing density of the bodies 5 which can be favourable for obtaining the required coalescence effect. Such an element can also be used within a device of the type of FIG. 1, in which case it is only used for increasing the density of the bodies.

It will be clear that the means for adding and/or removing bodies 5 from the cycle shown in FIG. 1 can also be used in the case of the other embodiment.

I claim:

1. A device for promoting the separation of a liquid to be treated, wherein said liquid includes components suspended therein, by coalescing said components, comprising:
   a substantially vertically-oriented chamber, having an inlet at its upper end for continuously admitting the liquid to be treated and a first outlet at its lower end for discharge of a more dense component and a second outlet near its upper end for discharge of a less dense component;
   a plurality of minute bodies suspended in the chamber throughout the liquid, said bodies of a material which is chemically inert to the liquid;
   a first grid near the bottom of said chamber above said first outlet and below said second outlet, extending across said chamber for preventing said bodies from being discharged through said first outlet;
   a second grid disposed across said second outlet to prevent said bodies from being discharged through said second outlet; and
   a jet mounted in the lower portion of said chamber above said first grid and below said second outlet, for discharging a compressed gas into the liquid to cause the liquid and said minute bodies to circulate together continuously within said chamber.

2. The device of claim 1 further comprising an auxiliary jet mounted within said chamber between said first outlet and said first grid for discharging a compressed gas into the liquid for unclogging said first grid.

3. A device for promoting the separation of a liquid to be treated, wherein said liquid includes components suspended therein, by coalescing said components, comprising:
   a substantially closed vertically-oriented chamber, having an inlet at its upper end continuously admitting the liquid to be treated and a first outlet at its lower end for discharge of a more dense component and a second outlet near its upper end for discharge of a less dense component;
   a plurality of minute bodies suspended in the chamber throughout the liquid, said bodies of a material which is chemically inert to the liquid;
   a first grid near the bottom of said chamber above said first outlet and below said second outlet, extending across said chamber for preventing said bodies from being discharged through said first outlet;
   a second grid disposed across said second outlet to prevent said bodies from being discharged through said second outlet; and
   a mechanical fluid-driving device mounted in the lower portion of said chamber above said first grid and below said second outlet to cause the liquid and said minute bodies to circulate together continuously within said chamber.

4. The device of claim 3 further comprising an auxiliary jet mounted within said chamber between said first outlet and said first grid for discharging a compressed gas into the liquid for unclogging said first grid.

* * * * *